United States Patent
Choo et al.

(10) Patent No.: US 11,341,564 B2
(45) Date of Patent: May 24, 2022

(54) METHOD, MEDIUM, AND SYSTEM FOR A LOCATION-BASED REAL-TIME DIGITAL ASSISTANT

(71) Applicant: Mercatus Technologies Inc., Toronto (CA)

(72) Inventors: Djen Choo, Mississauga (CA); Andrew John Isherwood, Toronto (CA); Sanil Matta, Toronto (CA); Stephen Seo, Toronto (CA)

(73) Assignee: Mercatus Technologies Inc., Toronto (CA)

(*) Notice: Subject to any disclaimer, the term of this patent is extended or adjusted under 35 U.S.C. 154(b) by 70 days.

(21) Appl. No.: 16/407,930

(22) Filed: May 9, 2019

(65) Prior Publication Data

US 2019/0347711 A1 Nov. 14, 2019

Related U.S. Application Data (60) Provisional application No. 62/670,192, filed on May 11, 2018.

(51) Int. Cl.
| | | |
|---|---|---|
| *G06Q 30/00* | (2012.01) | |
| *G06Q 30/06* | (2012.01) | |
| *H04W 4/02* | (2018.01) | |
| *H04W 4/024* | (2018.01) | |

(52) U.S. Cl.
CPC ..... *G06Q 30/0639* (2013.01); *G06Q 30/0627* (2013.01); *H04W 4/024* (2018.02); *H04W 4/025* (2013.01)

(58) Field of Classification Search
CPC .......... G06Q 30/0639; G06Q 30/0627; H04W 4/024; H04W 4/025
See application file for complete search history.

(56) References Cited

U.S. PATENT DOCUMENTS

| | | | |
|---|---|---|---|
| 2002/0091568 A1* | 7/2002 | Kraft | G06Q 30/02 705/14.58 |
| 2009/0012704 A1* | 1/2009 | Franco | G01C 21/20 701/532 |
| 2016/0335709 A1* | 11/2016 | Salvatore | H04W 4/02 |

OTHER PUBLICATIONS

Munson, Jonathan P., and Vineet K. Gupta. "Location-based notification as a general-purpose service." Proceedings of the 2nd international workshop on Mobile commerce. (Year: 2002).*

* cited by examiner

*Primary Examiner* — Matthew E Zimmerman
(74) *Attorney, Agent, or Firm* — McMillan LLP (57) ABSTRACT

A handheld device for use by a user or a consumer, that includes a custom application and is capable of interacting with its physical environment is disclosed. The device utilizes a positioning subsystem located in the device, and a priori or dynamic knowledge locations of stores, items and other geographic position markers. The devices assists the user in identifying and purchasing items of interest, in real time with relevant and timely location based information.

17 Claims, 7 Drawing Sheets

METHOD, MEDIUM, AND SYSTEM FOR A LOCATION-BASED REAL-TIME DIGITAL ASSISTANT

CROSS-REFERENCE TO RELATED APPLICATIONS

This application claims the benefit of U.S. Provisional Application No. 62/670,192 filed May 11, 2018.

TECHNICAL FIELD

The present disclosure relates generally to a digital assistant device and system and more particularly to a location-based real-time digital assistant device and system suitable for use in grocery and retail stores and other environments.

BACKGROUND OF THE INVENTION

Personal mobile devices, smartphones or digital assistants that employ a number of useful utilities such as electronic calendars, task lists, shopping lists, sketching tools and other communication tools are well known.

Nowadays, the ubiquity of inexpensive handheld personal communication devices coupled with the availability of relatively affordable access to broadband wireless data networks has significantly changed consumer behavior in a variety of environments and contexts. These environments include travel in personal automobiles or in public transit vehicles, dining in restaurants and bars, and shopping in neighborhood shops as well as in large retail complexes, and malls.

In an increasingly digital environment, individual consumers are often finding new ways to get ever more creative ways of utilizing their smartphones or other digital assistants in manners that were not possible before the advent of smartphones and ubiquitous affordable networks.

Although the communication and other capabilities of personal digital devices are often well used, improvements are desired. In particular, it is the object of the present disclosure to utilize the current capabilities of smartphones or other personal digital assistants, and data that often remains unleveraged, to enable even more useful applications that allow users to benefit from such devices in a variety of contexts.

SUMMARY OF THE INVENTION

In accordance with one aspect of the present disclosure, there is provided a handheld device for use by a consumer. The handheld device includes an application (app) that is capable of interacting with environment by utilizing a positioning subsystem located in the device, and a priori knowledge of certain predetermined locations of stores, items and other locations, to assist the user in identifying items or services of interest, in real time with relevant and timely information.

In accordance with one aspect of the present disclosure there is provided an electronic device for assisting a user in locating an item of interest. The device includes: a processor in communication with each of: an input interface; a display; a network interface; and a positioning subsystem; and a non-transitory computer readable medium storing processor executable instructions. When executed the instructions cause the processor to: receive a first coordinate indicative of a location of the device from the positioning subsystem; receive a second coordinate indicative of a location of the item; determine a measure based on the first and second coordinates; and in response to the measure being less than a predetermined threshold, display data associated with the item on the display.

In accordance with one aspect of the present disclosure there is provided a method of locating an item of interest using a device. The method includes: receiving a first coordinate indicative of a location of the device from a positioning subsystem; receiving at the device, a second coordinate indicative of a location of the item; determining a measure based on the first and second coordinates; and in response to the measure being less than a predetermined threshold, displaying data associated with the item on a display of the device.

In accordance with yet another aspect of the present dislcousre there is provided, a non-transitory computer readable storage medium configured to store instructions that when executed by a mobile electronic device having a processor in communication with each of: an input interface, a display, and a positioning subsystem, cause the device to carry out actions. The actions include: receiving a first coordinate indicative of a location of the device using the positioning subsystem; receiving a second coordinate indicative of a location of the item; determining a measure based on the first and second coordinates; and in response to the measure being less than a predetermined threshold, displaying data associated with the item.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE SEVERAL VIEWS OF THE DRAWINGS

In the accompanying figures, which illustrate by way of example only, one or more embodiments of the present invention.

DETAILED DESCRIPTION OF THE INVENTION

In this disclosure, the term "app" means a customized software application.

In this disclosure, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method, or use functions. The term "consisting of" when used herein in connection with a composition, use, or method, excludes the presence of additional elements and/or method steps.

Directional terms such as "top", "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

As noted in the background section earlier, consumers are getting ever more creative in finding ways of utilizing their smartphones or other digital assistant devices in ways that were not possible before the advent of smartphones and ubiquitous networks.

Studies of consumer behavior such as those from Ninth-Decimal, a mobile audience intelligence platform, have found that up to 86% of mobile consumers use their device to prepare for grocery shopping. The findings indicate that 69% of mobile consumers use their mobile devices or smartphones to find and save coupons, 59% use them to create shopping lists and 35% use the devices to browse recipes.

Further, the same studies have found that the interaction of consumers with their digital assistant devices continues well after they have entered retail or grocery stores. For example, it has been found that 59% of consumers use their mobile device while grocery shopping; 42% review shopping lists; 37% search for discounts and promos and 27% get competitor pricing while in the store.

The present disclosure relates to an electronic digital assistant device that assists users of the device in geographically locating items of interest in real time, typically in a retail or grocery environment. The present disclosure also relates to a method of assists users of the device in locating items of interest in real time.

While there are prior art apps that provide tools to help a shopper or consumer configure a digital shopping cart or prepare a shopping list prior to undertaking the shopping trip, these apps are typically largely passive and often no more useful than a shopping list on piece of paper, during the store visit when the client is actually shopping in store.

Accordingly, in one embodiment, an exemplary app running in a smartphone is used to provide a solution by leveraging access to a wide array of data which could provide enhanced utility and interactivity to a shopper inside the store.

System Architecture

Figure 1:
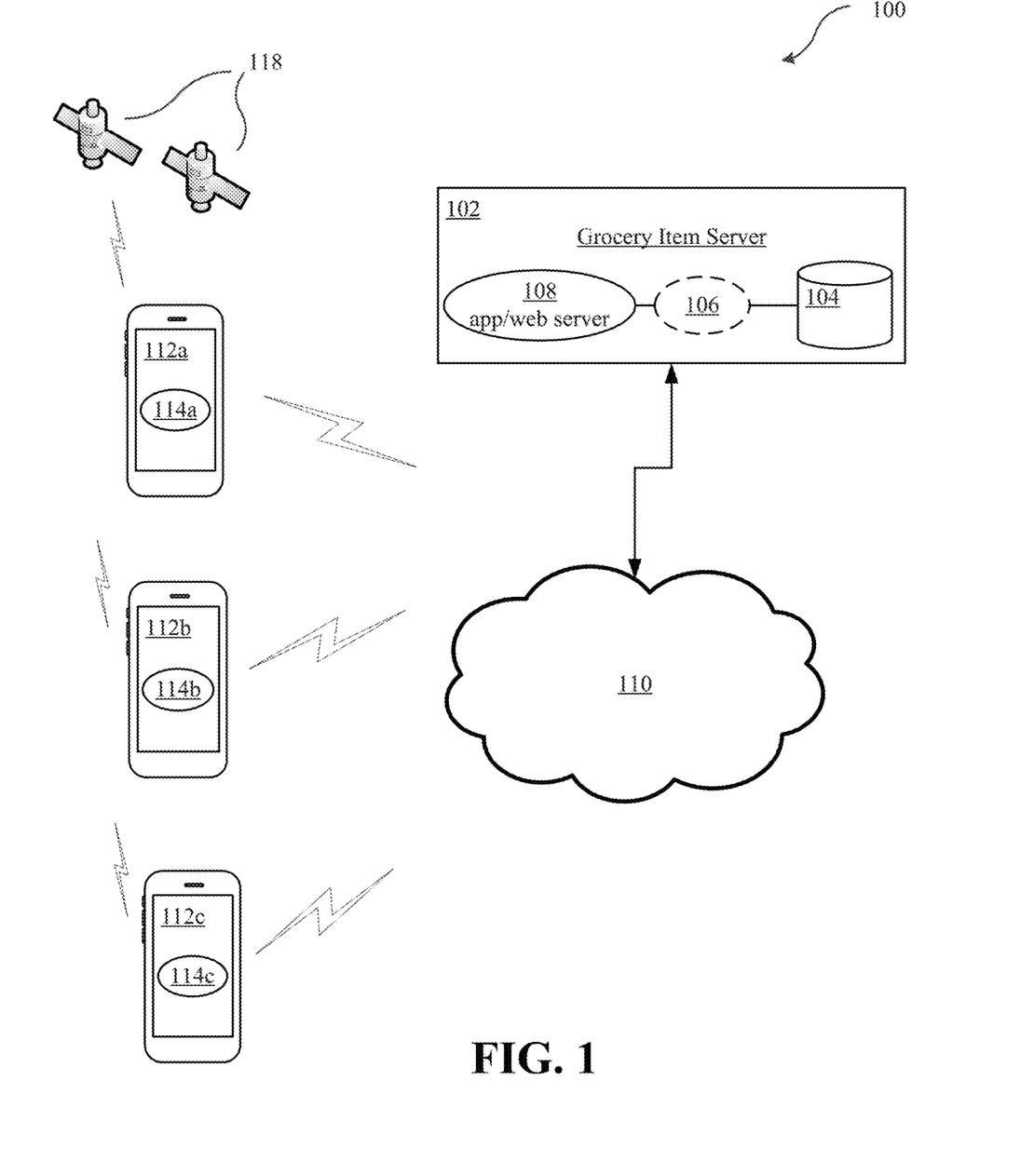
FIG. 1 is a schematic system block diagram of a system for utilizing a mobile device running an app, a server, and a global positioning system in a first embodiment of the present invention.

Referring to FIG. 1, and according to a first embodiment of an exemplary system described herein, there is depicted a simplified block diagram of a system 100. As depicted in FIG. 1, the system 100 includes a server side computing system 102 in data communication with digital electronic devices 112a, 112b, 112c (individually and collectively, "devices 112") via a network 110. Server side computing system 102 comprises a database 104, an app server or a web-server software 108, and a business application logic 106 and adapted for facilitating communication between the database 104 and the web-server software 108. Devices 112 determine their position by using signals received from a plurality of satellites 118 orbiting the earth.

As contemplated in this first embodiment, server side computing system 102 is a server. The server 102 includes a web-server or app-server software 108 running thereon adapted for communicating with an app 114 running on a device 112. The web-server software 108 can be any suitable web-server software that is adapted to permit apps and mobile browser software (e.g., Chrome™, Internet Explorer™, Mozilla Firefox™, Safari™) running on devices 112 to access data on server 102 through network 110. Suitable web-server software includes, but is not limited to, the Apache HTTP Server, the Internet Information Server (IIS). In other embodiments, the server side computing system can be a system comprising a network of computers (e.g. database server computer, application logic server computer, web-server computer), or a cloud service that uses a large network of server computers (e.g. database server computers, application logic server computers, web-server computers), the server computers collectively hosting multiple instances of application logic server software, database software, and web-server software. In other embodiments, the system does not include a web-server software running on a server that communicates to an app running on devices 112.

Server 102 is accessed by personal devices or digital devices 112 that each run a mobile application (e.g. app 114), or mobile browser software, via the Hypertext Transfer Protocol (HTTP) or its secure version (HTTPS) for data entry, shopping list entry, offer entry, digital coupon entry, image uploading, data editing, sending and receiving messages and various other activities enabled by the electronic commerce platform as will be described later. In other embodiments, the server is not accessed via HTTP or HTTPS, but instead is accessed via another suitable protocol.

Application logic 106 executing on server 102 implements application logic rules for system 100. As contemplated in this first embodiment, application logic 106 can be implemented as software components, services, server software, or other software components forming part of application logic 106. Application logic 106 encodes specific business rules determining the creation, manipulation, alteration, generation, or verification of data using data received from devices 112 or retrieved from database 104.

Database 104 provides storage for persistent data. Persistent data includes, but is not limited to, data related to items for sale in a store, such as name, prices, promotion periods, discounts, eligibility criteria, coupon information and the like.

As is known in the art, persistent data is often required for applications that reuse saved data across multiple sessions or invocations. As contemplated in this first embodiment, database 104 is supported by a relational database management software (RDBMS), and is encrypted. Suitable RDBMS include, but are not limited to, the Oracle server, the Microsoft SQL Server database, the DB2 server, MySQL server, and any alternative type of database such as an object-oriented database server software. Encryption can be done by any method known in the art. Suitable encryption methods or algorithms include, but are not limited to, RSA public-key encryption, Advanced Encryption Standard (AES), Triple Data Encryption Algorithm (3DES), and Blowfish. In other embodiments, the database on the server side computing system is not an RDBMS. In other embodiments, the database is not encrypted.

In alternate embodiments, server 102 has a separate database server hardware to host database 104 software. In other embodiments, the system has a separate application server computer for providing additional resources in terms of CPU, memory capacity, and storage capacity in order to improve the performance of the system. In other embodiments, the system further comprises a business logic server that is external to server 102, the business logic server for hosting an application logic (e.g. application logic 106). Other computing devices suitable for communication with server 102 or as devices 112 include, but are not limited to, server class computers, workstations, personal computers, and any other suitable computing device.

In this first embodiment, network 110 is the Internet. In other embodiments, the network can be any other suitable network including, but not limited to, a cellular data network, W-Fi™, Bluetooth™, WMax™, IEEE 802.16 (WrelessMAN), and any suitable alternative thereof. The suitable data communications interface contemplated in this embodiment between devices 112 and network 110 is wireless. The interface can be an antenna, a Bluetooth™ transceiver, a Wi-Fi™ adapter, or a combination thereof.

As contemplated in this first embodiment, devices 112 are smartphones or other handheld electronic devices. Non-limiting examples of such devices include smartphone (e.g. iPhone™, Blackberry™, Windows™ Phone, Android™ phone), personal digital assistant (PDA), cellular telephone, media player (e.g. iPod™), and a device which combines one or more aspects or functions of the foregoing devices. In other embodiments, the devices can be any other suitable electronic devices having a suitable data communications interface to network 110. Devices 112 may be used by the users of system 100 to participate in activities facilitated by the system 100 including, but not limited to, interactive services that assist the users in purchasing grocery items or other retail items while in the store. Each device 112 is equipped with an app 114 (shown as apps 114a to 114c in FIG. 1). As contemplated in this first embodiment, apps 114 communicate with server software 108 via network 110 and may further directly communicate satellites 118.

Server Hardware

Figure 2:
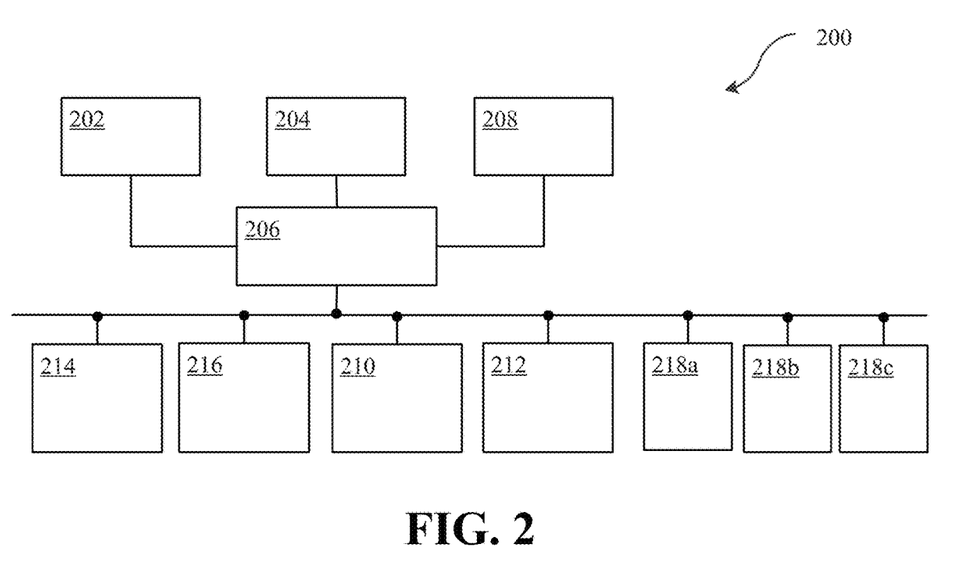
FIG. 2 is a simplified block diagram of hardware components of the exemplary server computing device used in FIG. 1.

Referring to FIG. 2, and according to an embodiment of server 102, there is depicted a simplified block diagram of computing device hardware 200. Hardware 200 comprises a processor 202 such as, but not limited to, a microprocessor, a memory medium 204, and interface circuit 206 adapted to provide a means of communication between processor 202 and memory medium 204. Interface circuit 206 also interconnects input and output (I/O) components such a display 214, a network adapter 216, and a storage medium 210. Interface circuit 206 also interconnects a printer 212 and one or more additional peripherals 218a to 218c (individually and collectively, peripherals 218). Suitable peripherals 218 include, but are not limited to a keyboard, a camera, a scanner, a touch panel, a joystick, an electronic mouse, touch screen, track-pad, and other input or pointing devices, and any combination thereof. In other embodiments, the interface circuit does not interconnect a printer. In other embodiments, the interface circuit does not interconnect any peripherals.

Memory medium 204 may be in the form of volatile memory or a combination of volatile and non-volatile memory, including, but not limited to, dynamic or static random access memory (RAM), read-only memory (ROM), flash memory, solid-state memory and the like.

Interface circuit 206 includes a system bus for coupling any of the various computer components 210, 212, 214, 216, 218 to the processor 202. Suitable interface circuits include, but are not limited to, Industry Standard Architecture (ISA), Micro Channel Architecture (MCA), Extended Industry Standard Architecture (EISA), VESA Local Bus (VLB), Peripheral Component Interconnect (PCI), Peripheral Component Interconnect Extended (PCI-X), Accelerated Graphics Port (AGP), Peripheral Component Interconnect Express (PCIe).

Storage medium 210 can be any suitable storage medium including, but not limited to, a hard disk drive (HDD), a solid-state drive (SSD), EEPROM, CD-ROM, DVD, and any other suitable data storage element or medium. Storage medium 210 is readable by processor 202.

Display 214 can be any suitable display including, but not limited to, monitor, a television set or a touch screen.

Network adapter 216 in server 102 facilitates wired or wireless connections to an Ethernet, W-Fi™, Bluetooth™, cellular network or other suitable network, thereby enabling connection to shared or remote drives, one or more networked computer resources, other networked devices, I/O peripherals and the like. Devices 112 also contain complementary network adapters therein for connecting with a suitable network, and are further equipped with browser or other thin-client or rich-client software. As contemplated in this embodiment, network adapter 216 comprises a wireless network interface card that allows communication with other computers through a data network such as network 110. In other embodiments, the network adapter does not comprise a wireless network interface card. In other embodiments, the network adapter communicates with the network via a wired connection.

Mobile Device Hardware

Figure 3:
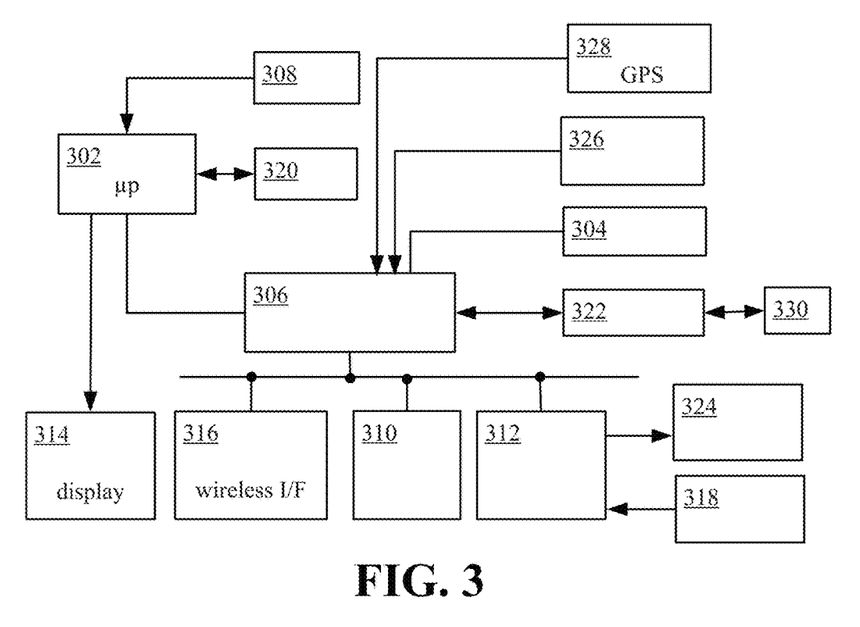
FIG. 3 is a simplified block diagram of hardware components of one of the mobile electronic devices depicted in FIG. 1.

Referring to FIG. 3, and according to an embodiment of a device, there is depicted a simplified block diagram of mobile device 112. Device 112 comprises a processor 302 such as, but not limited to, a microprocessor, a memory 304, a touch input 308, a battery 320, and a display 314. Several components and processor 302 communicate with each other through an interface circuit 306. Interface circuit 306 also interconnects components including, but not limited to, a wireless network interface 316, a storage medium 310, an input-output (I/O) interface 322, a camera 326, an audio codec 312 and a positioning module 328. Audio codec 312 in turn connects to one of more microphones 318 and one or more speakers 324. A sensor 330 and/or other components may interconnect to processor 302 via I/O interface 322.

In one embodiment, positioning subsystem 328 is be a global positioning system (GPS) module that transmits and/or receives signals from a satellite such as satellite 118 forming part of a satellite based positioning system or global navigation satellite system (GNSS). Positioning subsystem 328 can determine the location of the mobile device 112 based on signals received from GPS satellites and provide an indication of the determined location such as coordinates.

Wireless network interface 316 includes one or more of a wireless LAN transceiver (e.g. Wi-Fi™ transceiver), an infrared transceiver, a Bluetooth™ transceiver, and a cellular telephony transceiver. I/O interface 322 may include one or more wired power and communication interfaces such as a USB port.

Input 308 may be a keypad or keyboard, a touch panel, a multi-touch panel, a touch display or multi touch display having a software keyboard or keypad displayed thereon.

The store

Figure 4:
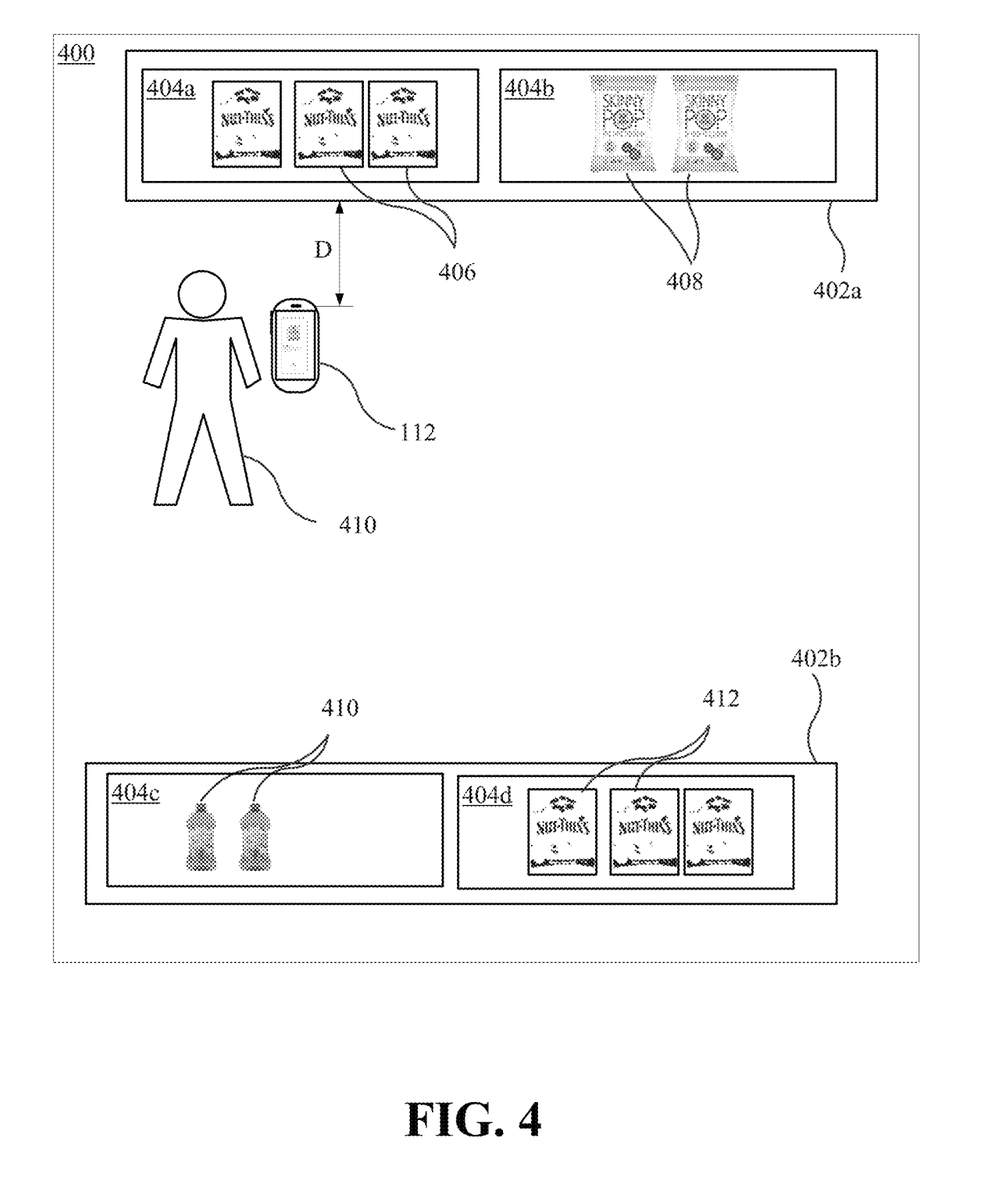
FIG. 4 is a simplified schematic block diagram of a user in a grocery store setting, making use of the mobile device of FIG. 1 in an exemplary embodiment.

FIG. 4 is a simplified schematic block diagram of a grocery store exemplary of a setting where it is contemplated that a user of device 112 makes use of the device 112 executing the app 114.

As shown, a grocery store 400 may include a plurality of aisles 402a, 402b where individual shelf units 404a, 404b, 404c and 404d are arranged. A number of items 406, 408, 410, 412 are arranged into the shelf units 404a, 404b, 404c and 404d respectively.

As shown items 406 are stored in shelf 404a, items 408 are stored in shelf 404b, items 410 are stored in shelf 404c, and items 412 are stored in shelf 404d. Localized identification of the location of items 406 can thus be made with reference to shelf unit identifiers, aisle identifiers, section identifiers such as produce section, canned foods section, or soft drink section and the like.

The app

Figure 5A:
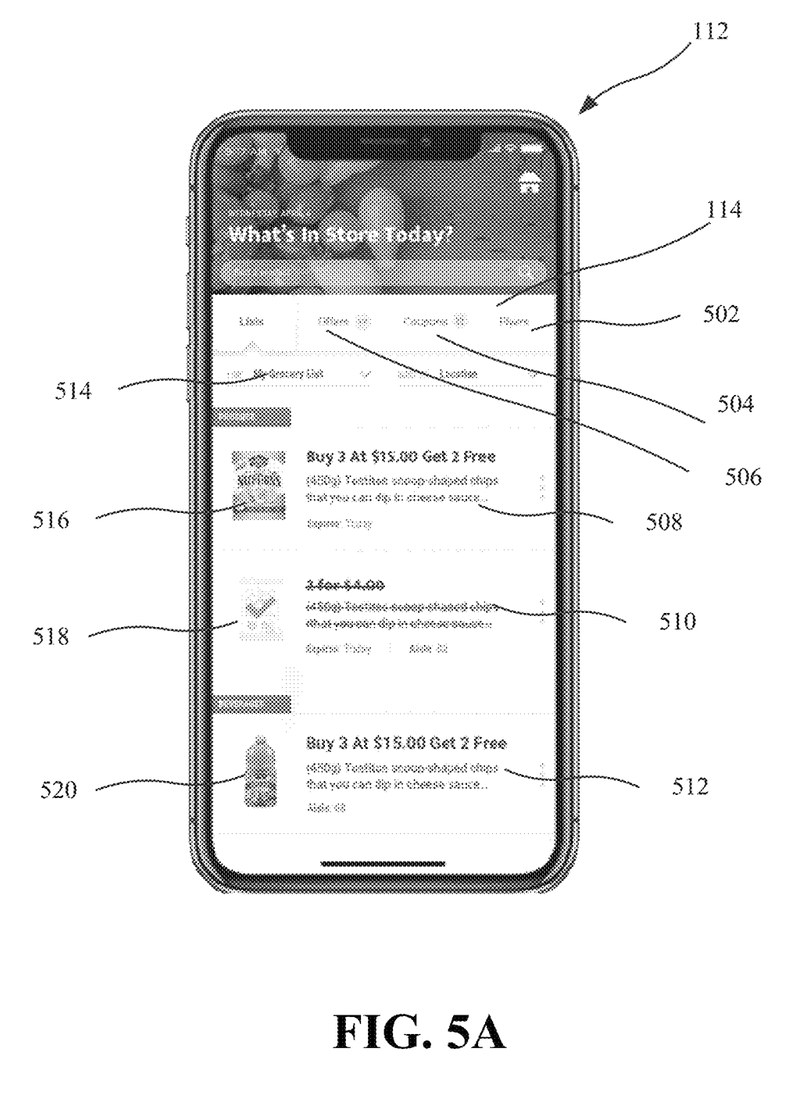
FIGS. 5A-5C are schematic illustrations of examples of interface pages of the app related to the mobile device running the app, interacting in real-time, with the user of FIG. 4.

As depicted in FIG. 5A, the app 114 executing on device 112 includes an exemplary graphical user interface (GUI). The GUI for app 114 may include user interface elements in the form of buttons, tabs, lists, images, text, text edit boxes, dropdown lists, radio buttons and the like.

User interface element 502 indicates if there are digital flyers stored in the app 114. Element 504 indicates available digital coupons if any, while element 506 indicates other available offers. Items of interest to the user include items whose' images are indicated in image elements 516, 518, 520 along with corresponding text elements 508, 510, 512 that describe the items and the nature of offers.

Text elements 508, 510, 512 may also provide explanations related to the offers that may be of use to the user, as determined from the shopping list displayed when selected by element 514, after being entered into the app 114. The presentation of the text itself such as the use of bold letters and/or strikeout fonts can also be used to convey information to the user. For example, text element 510 uses a strikethrough font to indicate that the associated offer has expired. The expiry may be determined by app 114 by comparing the current date and/or time to the period associated with the offer.

Figure 5B:
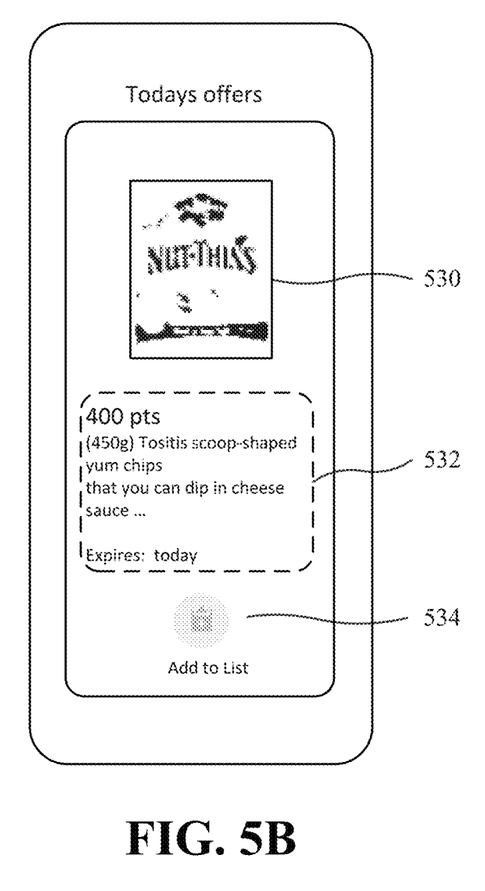
Figure 5C:
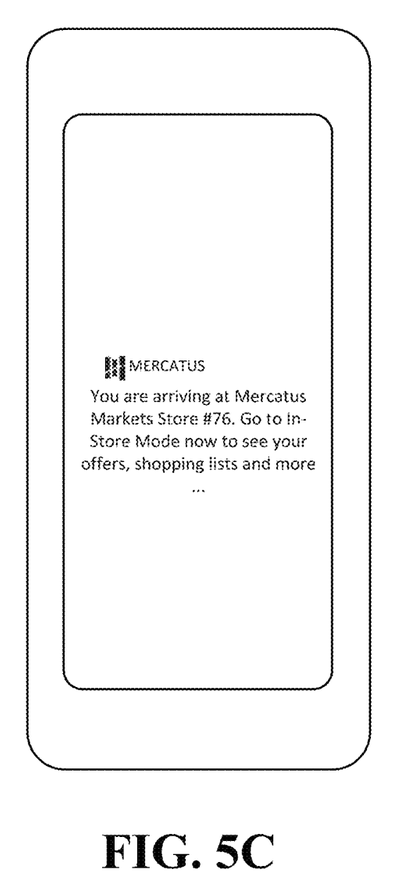

Other screen shots of graphical user interface for app 114 are depicted in FIG. 5B and FIG. 5C. GUI depicted in FIG. 5B may be displayed in response to an input received on an element in the GUI of FIG. 5A. For example, when element 516 or element 508 is selected, app 114 may display the GUI in FIG. 5B to better illustrate details of the corresponding offer provided in image 530, and text element 532. The GUI in FIG. 5B also includes a selection button 534 to add an item to a digital shopping cart of app 114. Alternately, as individual items may be prominently displayed automatically as the user gets close to the specific item of interest in the store.

The GUI depicted in FIG. 5C may be displayed in response to device 112 approaching a store that participates in the system 100 if FIG. 1. The user is alerted that a particular store that is registered with grocery item server 102 of FIG. 1 is in the vicinity.

In operation, a shopper, consumer or shopper represented by user 410 carrying device 112 having app 114 installed and executing thereon, may be guided to store 400 and once there, walks about the store 400. As the user walks about the store 400, device 112 running app 114 determines if items of interest to the user. If so, digital representations of the physical items of interest are displayed when the device 112 is in proximity to one of the physical items 406, 408, 410, 412 or to shelves 406a, 406b, 406c, 406d containing those items of interest placed thereon. The proximity may be determined as a measure based on the coordinates of the device 112 representing the user, and the coordinates of the item or items of interest.

In one embodiment, the location of items is provided by server 102 of FIG. 1. In other embodiments, sensor 330 may be used to provide the location of the items of interest or shelves or some other proxy that supplies exact or approximate location of the items. For example, RFID tags, Wi-Fi, Bluetooth or other technologies may be used in alternate embodiments.

Upon detecting the location coordinates of device 112 are within a threshold distance of at least one of the items of interest, app 114, in one embodiment, displays the screen depicted in FIG. 5A or FIG. 5B. In other embodiments, the GUI depicted in FIG. 5B may be displayed in response to an input received on an element in the GUI of FIG. 5A. For example, when element 516 or element 508 is selected, app 114 may display the GUI in FIG. 5B to better illustrate details of the corresponding offer.

Other offers may be limited to specific stores, geographic locations, items having certain expiry dates or other subsets of items, periods, geographic locations, user profiles and the like. Offers may also be tied to the profile of the user, such as senior's discounts, student discounts and the like. Many variations of promotions will be known to persons of skill in the art.

Figure 6:
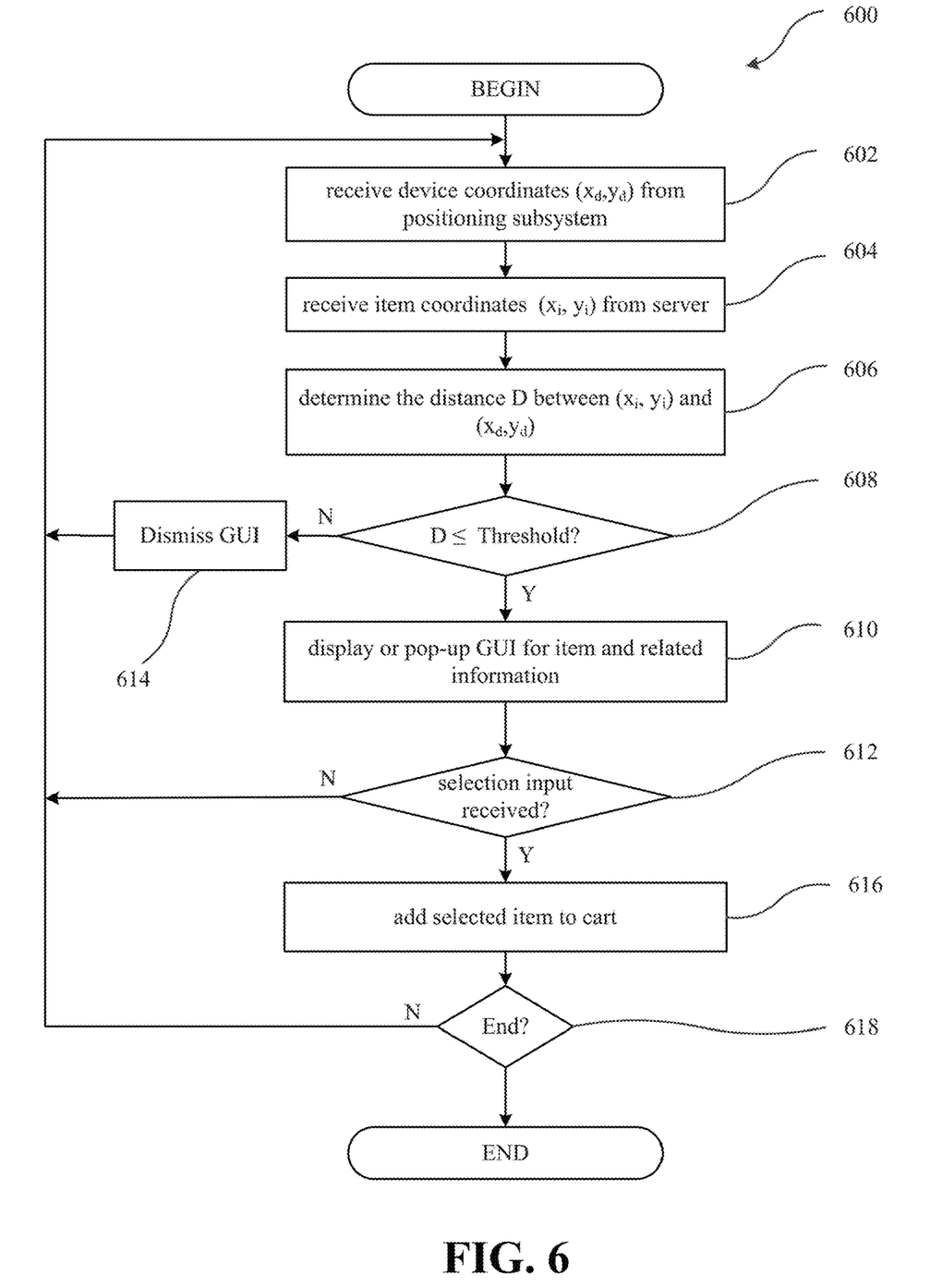
FIG. 6 is a flowchart illustrating exemplary procedural steps taken by the mobile electronic device operating within the system of FIG. 1, the device running an exemplary mobile application or an app.

An exemplary method or process executed by app 114 running in device 112 is summarized in flowchart 600 depicted in FIG. 6. Initially device 112 receives device location coordinates (step 602)—e.g., $(x_d, y_d)$ from its positioning subsystem 328 which in this particular embodiment is a GPS module. The app 114 receives the location of an item or items of interest (step 604)—e.g., $(x_i, y_i)$. App 114 then determines the distance D between the location of the device 112 and the location of the item of interest (step 606). In one embodiment, this may be carried out by computing the distance between the coordinates simply as:

$$D=\sqrt{(x_i-x_d)^2+(y_i-y_d)^2}$$

The determined distance D is then compared to a threshold distance (step 608). If the distance is less or equal to the threshold then app 114 displays or pops up a GUI similar to those shown in FIG. 5A, or FIG. 5B, (step 610). Otherwise, any such pop up GUI may be dismissed (step 614) as the device may have moved away from the relevant item. If a selection input is received while the GUI is still being shown (step 612), for example by clicking selection button 534, then app 114 adds the associated item into a shopping cart in app 114 (step 616). As part of step 616, app 114 may mark the items already in the digital shopping cart as having already been processed or picked and thus not of interest, so that they will not trigger the display of pop-up GUI when approached again.

App 114 may then check if it should be terminated (step 618) and if so, the process terminates. Otherwise, the method or process starts back at step 602.

The operation as depicted in FIG. 6 and FIG. 5A and FIG. 5B may be characterized as a first mode or "in-store mode" of app 114. However, in the depicted embodiment the app 114 also has a second mode, or "standard mode" which may be used anytime to assist the user with planning a shopping trip. In alternate embodiments, app 114 may have even more modes. Each mode may have its own set of user interface layouts, operations, sequence of steps, and associated experiences for the user. The in-store mode allows for contextual, real-time, in-store experience as described above with reference to FIG. 4, FIG. 5A, FIG. 5B and FIG. 6 and may be engaged automatically by app 114 depending on the time/date and location of device 112. That is, based on the location of device 112 and/or the date/time, app 114 may automatically switch to the appropriate mode (e.g., in-store mode when the user is in store 400). The user may manually override and switch back and forth between modes. For example, the standard mode may be manually chosen even when the user and device 112 are in store 400, where app 114 has been switched, automatically or dynamically, to its in-store mode based on its location coordinates and time/date. Whether automatic switching of modes is allowed can also be provided as an application setting. The standard mode may be used to guide a user to one of several stores in the system 100. The location of known stores, is provided by server 102 of FIG. 1 and can be used to guide the user to a store that participates in system 100 of FIG. 1. The method steps taken by app 114 to guide a user to a store are summarized in flowchart 700 in FIG. 7.

Figure 7:
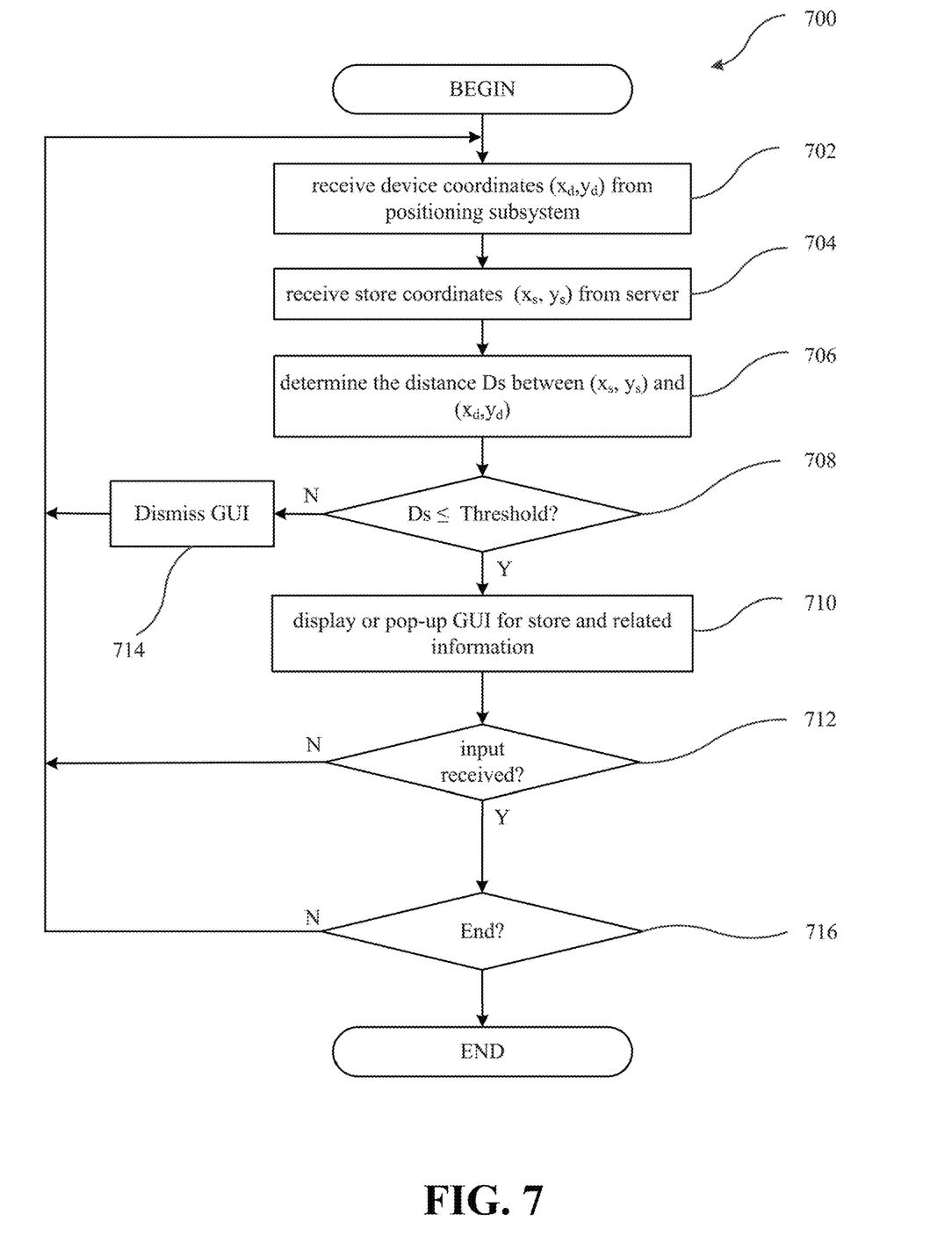
FIG. 7 is a flowchart illustrating another set of exemplary procedural steps taken by the mobile electronic device running an app when approaching a grocery store of FIG. 4.

Upon detecting that the location coordinates of device 112 are within a threshold distance of a store, app 114 displays the screen or GUI depicted in FIG. 5C. Initially device 112 receives device location coordinates (step 702)—e.g., $(x_d, y_d)$ from its positioning subsystem 328 which, as noted above, is a GPS module. The app 114 receives the location of an item or items of interest (step 704)—e.g., $(x_s, y_s)$. App 114 then determines the distance Ds between the location of the device 112 and the location of the store of interest (step 706). In one embodiment, this may be carried out by computing the distance between the coordinates simply as:

$$Ds = \sqrt{(x_s - x_d)^2 + (y_s - y_d)^2}$$

The determined distance Ds is then compared to a threshold distance (step 708). If the distance is less or equal to the threshold value then app 114 displays or pops up a GUI similar to those shown in FIG. 5A, or FIG. 5B, (step 710). This threshold value may be different from the threshold distance used in FIG. 6.

Otherwise, any such pop up GUI may be dismissed (step 714) as the device may have moved away from the relevant store. If the device 112 is determined to be inside the store, the GUO may be dismissed as well.

App 114 may then check an input is received (step 712) to terminate the app (step 716) and if so, the process terminates. Otherwise, the method or process starts back at step 702.

There are many advantages to adopting embodiments of the present invention in a retail or grocery environment. Increased utility can be realized as the app 114 provides a shopper an interface tailored to the in store experience with easy access to the functionality they are most concerned about in store.

In addition, the use of the app 114 reduces a shoppers wasted time in the store 400 by helping the shopper navigate the aisles to find products and locate the items on their list.

Moreover, enhanced information is provided to the user 410 by the use of this app 114. The app 114 and related system 100 thus augment the product information available in store 400 by providing quick access to online product information supplemented by $3^{rd}$ party data sources which may be fed into and consolidated in database 104 or alternately provided directly to app 114.

Although detailed exemplary embodiments have been discussed in relation to grocery stores, those of skill in the art will readily understand that the invention is not confined to just grocery stores but may be used in any formal or informal physical retail and other spaces where goods, services and other intangibles, are exchanged, sold, bartered or traded.

It is contemplated that any part of any aspect or embodiment discussed in this specification may be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

Unless defined otherwise, all technical and scientific terms used herein have the same meaning as is commonly understood by one of ordinary skill in the art to which this invention belongs. In addition, any citation of references herein is not to be construed nor considered as an admission that such references are prior art to the present invention.

The scope of the claims should not be limited by the example embodiments set forth herein, but should be given the broadest interpretation consistent with the description as a whole.

What is claimed is:

1. An electronic device for assisting a user in locating an item, said device comprising:
   a processor in communication with each of: an input interface; a display; a network interface; a sensor, and a positioning subsystem; and,
   a non-transitory computer readable medium storing processor executable instructions that, when executed, cause said processor to:
   determine, via said positioning subsystem, a first set of coordinates indicative of a location of said device from said positioning subsystem;
   detect, via said sensor, a second set of coordinates indicative of a location of a proxy device positioned to provide an exact or approximate location of said items, said sensor being one of an RFID sensor, a Wi-Fi sensor, and a Bluetooth sensor;
   determine a measure based on said first and second sets of coordinates;
   compare said measure with a predetermined threshold; and
   in response to said measure being less than said predetermined threshold, automatically display data associated with said item on said display;
   the device operable in a first mode and in a second mode, wherein:
   in said first mode, said processor executable instructions further cause said processor to guide said user to a store location storing said item; and in said second mode, said processor executable instructions further cause said processor to guide said user to said item within said store using said display; and wherein said processor executable instructions further cause said processor to automatically switch said device between said first mode and said second mode depending on at least one of said first set of coordinates, said second set of coordinates, and the current time.

2. The device of claim 1, wherein said network interface is in data communication with a server and wherein said data is retrieved from said server.

3. The device of claim 2, wherein said network interface is a wireless network interface.

4. The device of claim 1, wherein in said second mode, said data comprises an identification of one or more of: a localized identification of said item within said store, a price for said item and an image of said item.

5. The device of claim 4, wherein said localized identification comprises one or more of shelf unit identifiers, section identifiers and aisle identifiers.

6. The device of claim 1, wherein the measure is a physical distance computed between said device and said item.

7. The device of claim 3, wherein said network interface comprises one or more of a wireless LAN transceiver, a transceiver compliant with the Wi-Fi standard, an infrared transceiver, a transceiver compliant with the Bluetooth standard, and a cellular telephony transceiver.

8. The device of claim 1, wherein said first and second sets of coordinates are received in real time.

9. The device of claim 1, wherein said positioning subsystem is a global positioning system (GPS) module.

10. A method of locating an item using a device, the method comprising:

obtaining a first set of coordinates indicative of a location of said device from a positioning subsystem;

detecting, via a sensor of said device, a second set of coordinates indicative of a location of a proxy device positioned to provide an exact or approximate location of said item, said sensor being one of an RFID sensor, a Wi-Fi sensor, and a Bluetooth sensor;

determining a measure based on said first and second sets of coordinates; and comparing said measure with a predetermined threshold; and in response to said measure being less than said predetermined threshold, displaying data associated with said item on a display of said device, said device operable in a first mode and in a second mode, wherein:

in said first mode, said data comprises directions to a location of a store where said item is stored; and in said second mode, said data comprises localized identification of said item within said store; and the method further comprising automatically switching said device between said first mode and said second mode depending on at least one of said first set of coordinates, said second set of coordinates, and the current time.

11. The method of claim 10, wherein in said second mode, said data comprises an identification of one or more of: a localized identification of said item within said store, a price for said item and an image of said item.

12. The method of claim 11, wherein said localized identification comprises one or more of shelf unit identifiers, section identifiers and aisle identifiers.

13. The method of claim 10, wherein the measure is a physical distance computed between said device and said item.

14. A non-transitory computer readable storage medium configured to store instructions that when executed by a mobile electronic device having a processor in communication with each of: an input interface, a display, a network interface, a sensor, and a positioning subsystem, cause the device to carry out actions for locating an item using the device, said actions including:

receiving, via said positioning subsystem, a first set of coordinates indicative of a location of said device using said positioning subsystem;

detecting, via said sensor, a second set of coordinates indicative of a location of a proxy device positioned to provide an exact or approximate location of said item, said sensor being one of an RFID sensor, a Wi-Fi sensor, and a Bluetooth sensor;

determining a measure based on said first and second sets of coordinates;

comparing said measure with a predetermined threshold; and in response to said measure being less than the predetermined threshold, displaying data associated with the one of said items of interest on said display said device operable in a first mode and in a second mode, wherein:

in said first mode, said data comprises directions to a location of a store where said item is stored; and in said second mode, said data comprises localized identification of said item within said store; and the actions further comprising, automatically switching said device between said first mode and said second mode depending on at least one of said first set of coordinates, said second set of coordinates, and the current time.

15. The non-transitory computer readable storage medium of claim 14, wherein in said second mode, said data comprises an identification of one or more of: a localized identification of said item within said store, a price for said item and an image of said item.

16. The non-transitory computer readable storage medium of claim 15, wherein said localized identification comprises one or more of shelf unit identifiers, section identifiers and aisle identifiers.

17. The non-transitory computer readable storage medium of claim 14, wherein the measure is a physical distance computed between said device and said item.

* * * * *